United States Patent [19]
Flaherty

[11] Patent Number: 5,565,670
[45] Date of Patent: Oct. 15, 1996

[54] CORDLESS RF LINK FOR BAR CODE INPUT DEVICE MODULATING IMPULSES CORRESPONDING TO DATA STATE TRANSITIONS

[75] Inventor: John D. Flaherty, Stanwood, Wash.

[73] Assignee: Intermec Corporation, Everett, Wash.

[21] Appl. No.: 407,691

[22] Filed: Mar. 21, 1995

[51] Int. Cl.$^6$ ........................................... G06K 7/10
[52] U.S. Cl. .......................... 235/472; 235/462; 235/463
[58] Field of Search ................................. 235/472, 462, 235/463

[56] References Cited

U.S. PATENT DOCUMENTS

| | | | |
|---|---|---|---|
| 3,676,645 | 2/1972 | Fickenscher et al. | 235/463 X |
| 3,700,858 | 10/1972 | Murthy | 235/472 X |
| 3,716,699 | 2/1973 | Eckert, Jr. et al. | 235/472 X |
| 3,744,025 | 7/1973 | Bilgutay | 235/472 X |
| 3,796,863 | 3/1974 | Nickl et al. | 235/462 |
| 3,826,900 | 7/1974 | Moellering | 235/472 X |
| 3,985,999 | 10/1976 | Yoneyama | 235/472 X |
| 3,991,299 | 11/1976 | Chadima, Jr. et al. | 235/472 X |
| 4,409,470 | 10/1983 | Shepard et al. | 235/472 |
| 4,528,443 | 7/1985 | Smith | 235/472 X |
| 4,751,375 | 6/1988 | Ravizza | 235/472 |

Primary Examiner—Donald T. Hajec
Assistant Examiner—Jeffrey R. Filipek
Attorney, Agent, or Firm—Graham & James

[57] ABSTRACT

An apparatus for reading a bar code symbol is provide which includes a bar code scanner and a receiver. The scanner transmits an RF signal representation of the bar code symbol to the receiver that includes substantially less information than that originally present in the bar code, thus reducing the need for electrical power. The receiver reconstructs the original information of the bar code symbol from the RF signal. The scanner comprises an encoding element that converts a first signal representative of light reflected from the bar code symbol to a second signal representative only of bar-to-space and space-to-bar transitions of the bar code symbol. An RF transmitter within the scanner provides an RF signal from the second signal. The receiver comprises an RF receiving element adapted to receive the RF signal and reconstruct the first signal from the RF signal. To insure proper polarity of the reconstructed signal, a first one of the bar-to-space and space-to-bar transitions is presumed to be a space-to-bar transition.

23 Claims, 4 Drawing Sheets

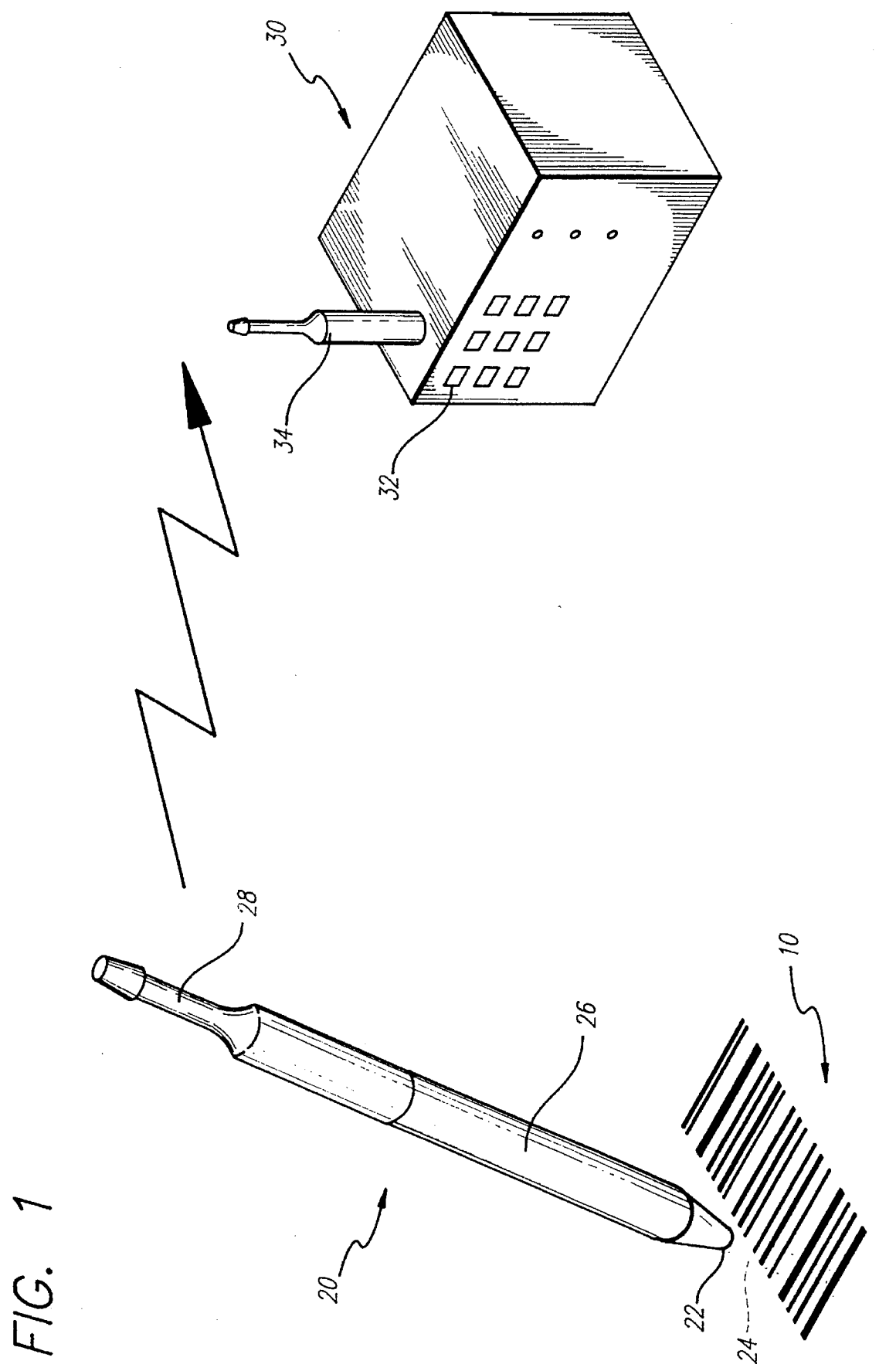

5,565,670

CORDLESS RF LINK FOR BAR CODE INPUT DEVICE MODULATING IMPULSES CORRESPONDING TO DATA STATE TRANSITIONS

BACKGROUND OF THE INVENTION

1. Field of the Invention.

The present invention relates to handheld optical scanners for reading bar code symbols, and more particularly, to a data transmitting format that enables cordless operation for such optical scanners.

2. Description of Related Art

Optical imaging systems are commonly used to decipher data symbology printed on objects in order to identify the objects. A bar code symbol represents a popular form of symbology, and typically comprises a pattern of parallel bars of various widths separated by spaces of various widths. Since the bar and space elements have different light reflecting characteristics, a scanner can convert the bar code symbol into an electrical signal by analyzing the light reflected from the symbol. The electrical signal can then be decoded to provide an alphanumeric representation of the symbol which identifies the object. Bar code symbols of this nature are commonly used in inventory control, point of sale identification, transportation, or other such material handling applications.

The typical bar code scanner uses light that is drawn across the bar code field. Since the bar code symbols are often disposed on the object to be identified, it is desirable for the scanner to be included in a handheld or portable device so that the scanner can be brought to the object. Light emitting diodes (LEDs) are commonly utilized within such scanners to provide the scanning light due to their light weight and low power requirements. The operator can physically move the LED across the bar code field, such as by use of a light pen or wand. Alternatively, a bar code scanner may include movable mirrors that automatically articulate the light back and forth at a high rate to scan across the bar code field. The operator would normally be provided with a feedback signal, such as an audible tone, that notifies the operator of the successful completion of a bar code reading operation.

Conventional light pens are tethered or connected to a base processor by a cable. These light pens usually include little more than a light emitting element such as the LED, a light detecting element for receiving the reflected light, an associated amplifier, and an analog to digital (A/D) converter. The light detecting element may comprise a conventional photo-diode, photo-transistor, or charge coupled device (CCD) type sensor. The reflected light is detected by the light detecting element, which produces an electrical signal that represents the reflected light. The electrical signal is then amplified by the amplifier and converted to a digital output signal by the A/D converter. The cable carries electrical power from the base processor to the light pen, and carries the digital output signal to the base processor. By virtue of its relative unsophistication, a light pen can be small, lightweight and inexpensive. The circuitry necessary to decode the alphanumeric data from the digital output is contained within the base processor, which may further communicate with another centralized processor.

A drawback of tethered light pens is that the cable can often be cumbersome for the operator to use. For example, the cable may not be long enough to reach a bulky item to be scanned, or may get bound up while trying to reach an awkwardly positioned item. To address this problem, cordless handheld scanners have been developed that incorporate radio frequency (RF) technology. These cordless RF scanners are more sophisticated than conventional light pens, and in addition to the elements of a conventional light pen also include decoding circuitry, a power source (e.g., battery pack), and an RF transmitter. The digital output signal is decoded by the decoding circuitry contained within the cordless RF scanner. The decoded data may be stored temporarily in a memory before being transmitted to the centralized base processor over an RF link. The centralized base processor may be capable of receiving inputs from one or more of the cordless RF scanners, providing the scanner operators with substantially greater flexibility and autonomy. These benefits are particularly desirable for certain high volume bar code users that may simultaneously employ numerous scanner operators, such as within a factory environment.

Notwithstanding these significant benefits, however, the cordless RF scanners are necessarily larger and heavier due primarily to the battery pack, and are also more expensive than the relatively simple tethered light pens due to their increased complexity. Moreover, these cordless RF scanners have a relatively high demand for electrical power, requiring frequent battery pack changes and/or recharging cycles. While larger capacity battery packs can increase the usable life of the cordless RF scanners, this also tends to further increase the weight and bulk of the scanners. These drawbacks tend to diminish the desirability of cordless scanners, especially for less intensive bar code users that may only require a single scanner operator.

Accordingly, a critical need exists for a simple, cordless bar code scanner that can communicate with a base processor over an RF link. Ideally, the cordless scanner should have minimal processing capability so as to reduce power consumption and battery capacity, yet be capable of providing a user with the same high level of flexibility, autonomy and convenience typical of more complex, cordless RF scanners.

SUMMARY OF THE INVENTION

In accordance with the teachings of the present invention, a cordless apparatus for reading a bar code symbol is provided. The apparatus includes a bar code scanner and a receiver. The scanner transmits an RF signal representation of the bar code symbol to the receiver that includes substantially less information than that originally present in the bar code symbol, thus reducing the demand for electrical power. The receiver reconstructs the original information of the bar code symbol from the RF signal.

More particularly, the scanner comprises light transmitting, detecting and processing elements typical of all such devices, but also includes additional circuitry that converts a first signal representative of light reflected from the bar code symbol to a second signal representative only of bar-to-space and space-to-bar transitions of the bar code symbol. An RF transmitter within the scanner provides an RF signal based upon the second signal. The receiver comprises an RF receiving element adapted to receive the RF signal and reconstruct the first signal from the RF signal. In reconstructing the first signal, a first one of the bar-to-space and space-to-bar transitions is presumed to be a space-to-bar transition.

In an embodiment of the present invention, the scanner includes a positively triggered one-shot circuit coupled in parallel with a negatively triggered one-shot circuit to convert the first signal to the second signal. An input of each of the one-shot circuits is coupled to receive the first signal, and an output of each of the one-shot circuits is coupled to respective inputs of a logical OR gate. An output of the logical OR gate provides the second signal. The receiver includes a positively triggered one-shot circuit coupled to receive the RF signal and a two-position relay circuit having an input coupled to an output of the one-shot circuit. A timer circuit is coupled to a reset input of the two-position relay circuit, and returns the two-position relay circuit to an initial state after expiration of a predetermined period of time.

To further conserve power, the scanner comprises an internal power source having three modes of operation. In a first mode of operation, power to the light transmitting and detecting element is disabled until the scanner is moved. In a second mode of operation, a reduced power level is provided to the light transmitting and detecting element sufficient to detect the start of a bar code scanning operation. In a third mode of operation, a full power level is provided to the light transmitting and detecting element so that the RF signal can be generated and transmitted. The scanner only draws power at the full power level when it is transmitting RF signals representative of the bar-to-space and space-to-bar transitions.

A more complete understanding of the cordless RF bar code symbol scanner and receiver will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIG. 1 is a perspective view of a cordless RF bar code symbol scanner and receiver of the present invention;

DETAILED DESCRIPTION OF THE PREFERRED EMBODIMENT

Figure 2A:
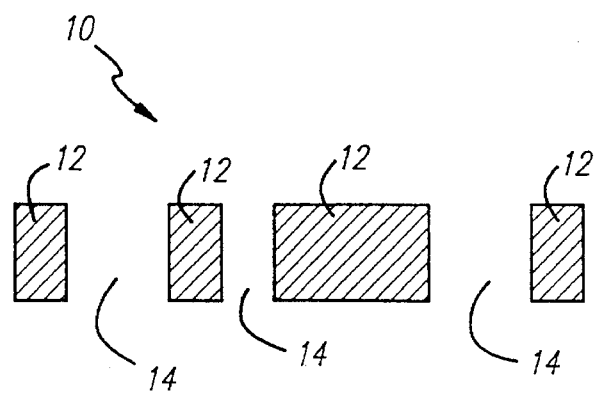
FIGS. 2A through 2F illustrate electronic signal representations of an exemplary bar code symbol at various stages of processing.

The present invention satisfies the critical need for a simple, cordless bar code scanner that can communicate with a receiver over an RF link. To reduce the demand for electrical power, and keep the handheld scanner as compact and lightweight as possible, the scanner transmits an RF signal representation of the bar code symbol that includes substantially less information than that originally present in the bar code symbol. The receiver reconstructs the original information of the bar code symbol from the RF signal. In the description that follows, like reference numerals are used to describe like elements of one or more of the various figures.

Referring first to FIG. 1, an RF bar code scanner 20 and receiver 30 of the present invention is illustrated in conjunction with an exemplary bar code symbol 10. The bar code symbol 10 comprises a field of parallel bars having varying widths and uniform length, and each of the bars are separated by spaces of varying widths. As known in the art, the bar code symbol 10 represents an alphanumeric code that can be interpreted by a bar code reader based on the particular widths and spacing of the bars. As will be described below, the handheld scanner 20 can be used to read the information contained within the bar code symbol 10 and transmit the information to the receiver 30.

As illustrated in FIG. 1, the scanner 20 comprises a light pen having a tubular-shaped housing 26 with a light emitting element 22 disposed at an end thereof, although alternative shapes and configurations for the scanner can also be advantageously utilized. As known in the art, the light emitting element 22 may include one or more light emitting diodes (LEDs). To read the information of the bar code symbol 10, the operator draws the scanner 20 across the bar code symbol and light emitted from the emitting element 22 (illustrated in phantom at 24) is reflected off of the bar and space elements of the bar code symbol. Since the bar and space elements each have differing light reflective characteristics, the changes in light reflectance can be detected by a detecting element (not shown in FIG. 1) within the light pen housing 26 and encoded into a signal representative of the bar code symbol 10. The bar code scanner 20 further includes an antenna 28 that is used to transmit an RF signal from the scanner that contains information representative of the bar code symbol 10. As known in the art, various electronic devices may be utilized as the detecting element, such as a photo-diode, photo-transistor or charged coupled device (CCD).

The bar code receiver 30 receives the RF signal from the scanner 20 and converts the signal into a form that can be processed into the desired alphanumeric information represented by the bar code symbol 10. The receiver 30 may include a keypad 32 for entry of control information by an operator, and an antenna 34 for receiving the RF signal from the scanner 20. The transmitting range between the scanner 20 and receive 30 may be up to several hundreds of feet. In one possible mode of operation, the receiver 30 may operate with a plurality of like scanners 20, with each one of the scanners transmitting at a distinct RF frequency.

Figure 2B:

The processing of the information contained within the bar code symbol 10 of FIG. 1 is now illustrated in FIGS. 2A through 2F. FIG. 2A illustrates a portion of the bar code symbol 10 in enlarged form, including bars 12 of varying widths separated by spaces 14 of varying widths. The light emitting element 22 of the scanner 20 illuminates the bar code symbol 10, and the detecting element detects the light reflected from the bar and space elements of the bar code symbol. The detected changes in the light reflectance characteristic from the bar code symbol 10 is converted to a digital signal, illustrated in FIG. 2B. The digital signal has two states, including a first state (also referred to as a data 0) corresponding to presence of a space 14, and a second state (also referred to as a data 1) corresponding to presence of a bar 12. The pulse widths of the respective first and second data states correspond to the widths of the space 14 and bar 12 elements of the bar code symbol 10. This digital output signal of FIG. 2B is typical of that generated by conventional light pens.

A conventional bar code reading system can readily convert the digital output signal to an alphanumeric representation of the bar code symbol 10 by use of various known digital processing techniques, such as data sampling or pattern recognition. Such data conversion is typically accomplished within a base processor that receives the digital output signal over a cable from the light pen, or alternatively, the data conversion may be accomplished within a more sophisticated handheld processor.

Figure 2C:

Instead of processing the digital signal of FIG. 2B through these conventional techniques, in the present invention the information of the signal is substantially reduced in order to minimize the RF transmitting requirement of the scanner 20. As illustrated in FIG. 2C, the digital signal of FIG. 2B is reduced to a series of impulses, with each of the impulses corresponding to a data state transition of the digital signal. Mathematically, the impulse series of FIG. 2C comprises an absolute value of a first derivative of the digital signal of FIG. 2B.

In particular, the first bar 12 of the bar code symbol 10 is represented in the digital signal of FIG. 2B as a pulse that transitions first from the first data state to the second data state. The digital signal remains in the second data state for a period of time corresponding to the width of the bar 12. At the transition between the first bar 12 and space 14, the signal returns to the first data state. In FIG. 2C, the portion of the digital signal corresponding to the first bar 12 is reduced to a first impulse occurring at the transition from the first data state to the second data state (corresponding to a leading edge of the first bar 12) and a second impulse occurring at the transition from the second data state to the first data state (corresponding to a trailing edge of the first bar 12). The remainder of the digital signal is converted to impulses in like fashion.

Figure 2D:
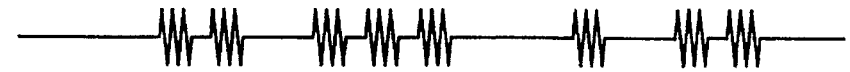

Once the digital signal is converted into a series of impulses, as in FIG. 2C, the impulse signal is used to modulate an RF carrier to generate the signal of FIG. 2D. The RF carrier may operate in a conventional frequency modulation (FM) range, such as in a range between 100 to 250 MHz. At such frequencies, each of the impulses would be represented as a few cycles separated by gaps corresponding to the time between data state transitions. An RF transmitter disposed within the light pen 20 would only be drawing electrical current during the time that the modulated impulses are being transmitted, comprising a relatively small percentage of the time duration over which the information pertaining to a single bar code symbol 10 is being transmitted.

Figure 2E:
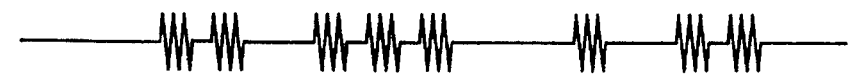
Figure 2F:
Figure 3:
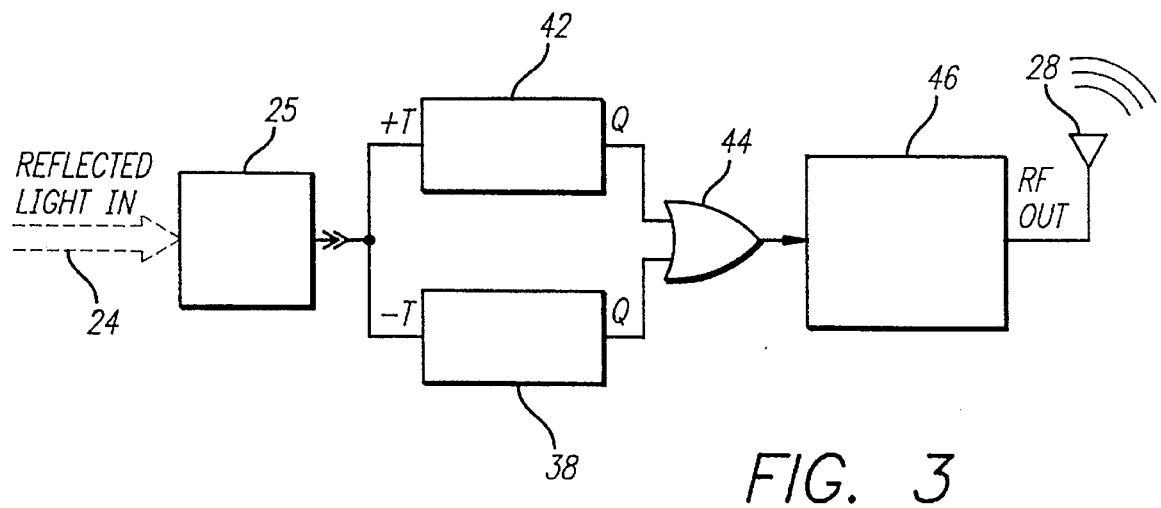
FIG. 3 is a schematic diagram of the bar code scanner of the present invention.

The receiver 30 receives the modulated impulse signal of FIG. 2D, and decodes the signal to derive the original digital signal of FIG. 2B. FIG. 2E illustrates the received RF signal as being identical to the transmitted RF signal of FIG. 2D. Decoding of the RF signal is dependent upon a fundamental characteristic of all bar code symbols—the first transition is always from a space to a bar. Otherwise, the above described process of converting the digital signal to an impulse signal is reversed to regenerate the digital signal of FIG. 2F, which is identical to the digital signal of FIG. 2B. The digital signal of FIG. 2F can then be processed into alphanumeric information by use of conventional techniques.

Referring next to FIGS. 3 and 4A through 4D, an exemplary signal processing circuit of the scanner 20 of FIG. 1 is illustrated. The signal processing circuit includes a light detecting element 25, a pair of one-shot circuits 38, 42, a logical OR gate 44, and an RF transmitter 46. The light reflectance input to the scanner 20 is converted to the digital signal of FIG. 4A by the light detecting element 25. The light detecting element 25 is coupled to the pair of one-shot circuits, including a positively triggered one-shot circuit 42 and a negatively triggered one-shot circuit 38. Each of the one-shot circuits may be provided by conventional monostable multivibrators, or other known equivalent circuits.

Figure 4A:
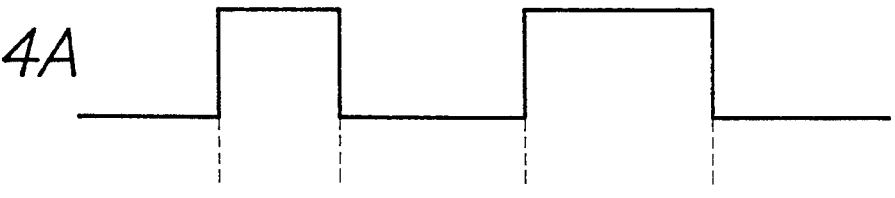
FIGS. 4A through 4D illustrate an electronic signal at various stages of processing within the bar code scanner of FIG. 3.
Figure 4B:
Figure 4C:
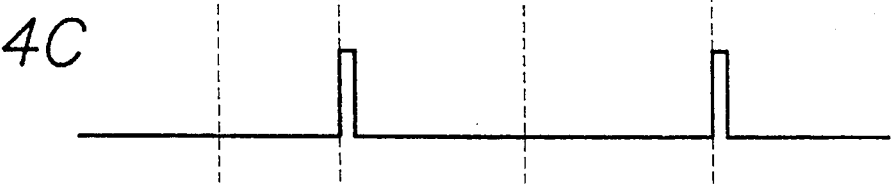
Figure 4D:
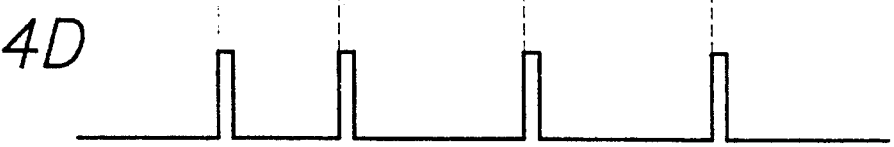
Figure 5:
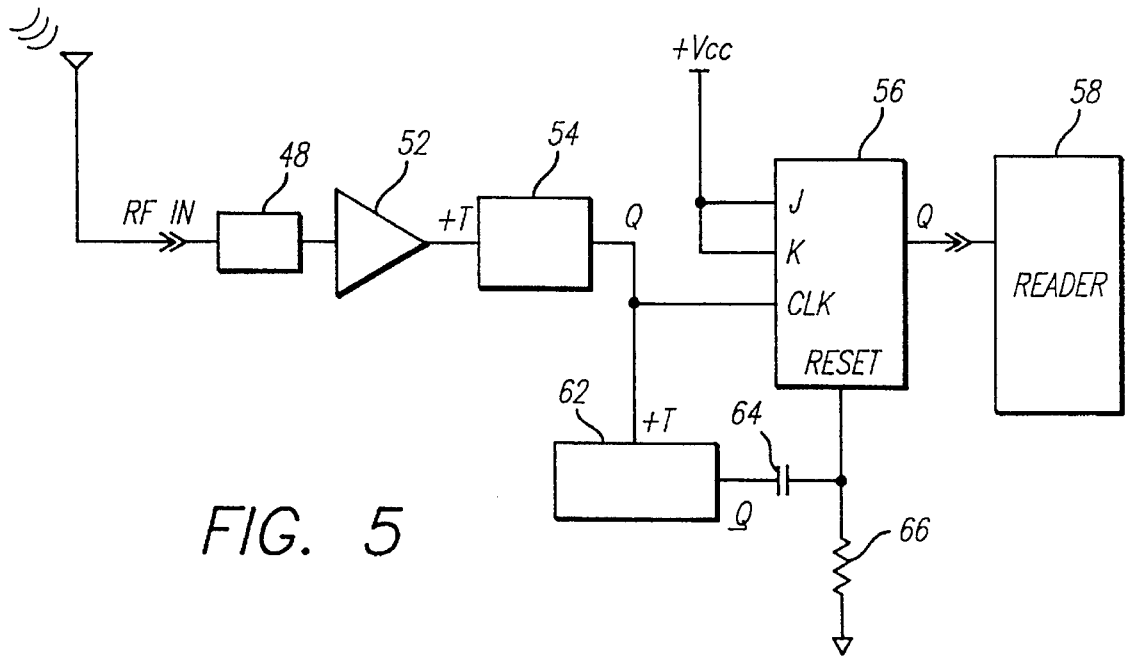
FIG. 5 is a schematic diagram of the RF receiver of the present invention.

The output of the positively triggered one-shot circuit 42 is illustrated at FIG. 4B as an impulse occurring with each positively-going transition of the digital signal of FIG. 4A. Similarly, the output of the negatively triggered one-shot circuit 38 is illustrated at FIG. 4C as an impulse occurring with each negatively-going transition of the digital signal of FIG. 4A. The outputs of the positively triggered one-shot circuit 42 and the negatively triggered one-shot circuit 38 are coupled to respective inputs of the logical OR gate 44, which provides the output signal of FIG. 4D. Note that the impulse signal of FIG. 4D comprises the impulse signal of FIG. 2C. Finally, the logical OR gate 44 is coupled to the RF transmitter 46 that modulates an RF carrier by the impulse signal to provide the RF signal of FIG. 2D. The RF signal is then transmitted through the antenna 28.

Figure 6A:
FIGS. 6A through 6D illustrate a received RF signal at various stages of processing within the RF receiver of FIG. 5.
Figure 6B:
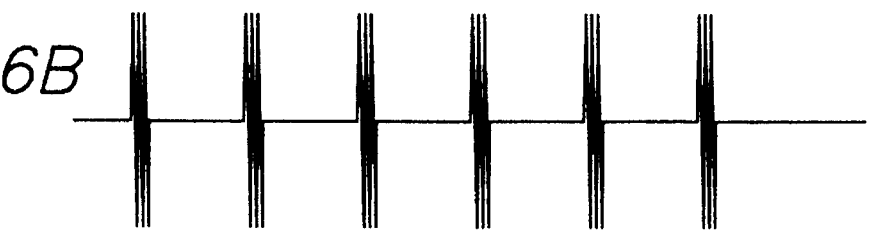

FIGS. 5 and 6A through 6D illustrate an exemplary signal processing circuit of the receiver 30 of FIG. 1. The signal processing circuit includes an RF receiver 48, an amplifier 52, a one-shot circuit 54, a two-position circuit 56 and a decoder 58. The RF signal transmitted by the scanner 20 is received by the RF receiver 48 as the signal of FIG. 6A. The amplifier 52 is coupled to the RF receiver 48, and boosts the amplitude of the received RF signal to a level appropriate for further processing of the signal, as illustrated in FIG. 6B. The amplifier 52 may further include additional filters as necessary to reduce noise in the received signal, depending on the operational environment of the receiver 30.

Figure 6C:
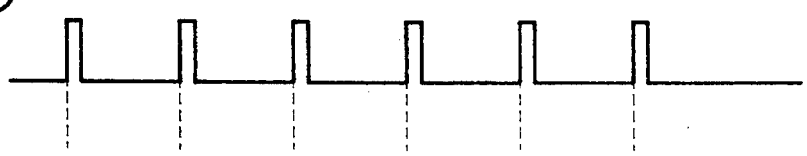

The amplifier 52 is further coupled to a positively triggered input of the one-shot circuit 54 (labeled as +T in FIG. 5), which produces an impulse sequence from the RF signal, as illustrated in FIG. 6C. Alternatively, the one-shot circuit 54 may be negatively triggered, and may be provided by conventional monostable multivibrators, or other known equivalent circuit. The impulse sequence comprises the bar-to-space and space-to-bar transitions of the original bar code symbol. The Q output of the one-shot circuit 54 is coupled to the clock input of a two-position circuit 56 (labeled as CLK in FIG. 5), which causes the two-position circuit to toggle between two data states upon receipt of an impulse input. The two-position circuit may be provided by a bistable multivibrator, or other known equivalent circuit. The J and K inputs of the two-position circuit are coupled to a positive voltage source (labeled as Vcc in FIG. 5). Accordingly, with each successive impulse received at the two-position circuit 56, an output of the two-position circuit changes between the two data states, providing the digital signal of FIG. 6D, which should be identical to the original digital signal provided by the detecting element 25 of FIG. 3. The digital signal is then provided to the decoder circuit 58, that decodes the signal into the alphanumeric information by known signal processing techniques such as described above.

Figure 6D:
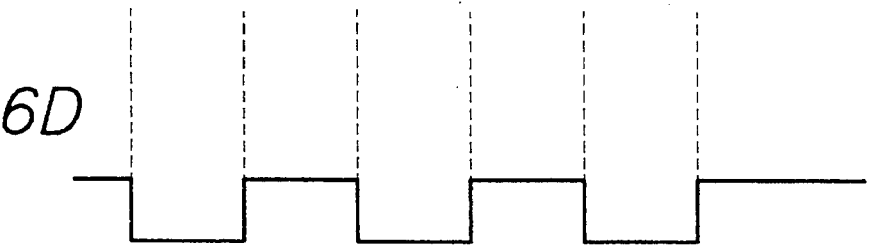

The proper polarity of the digital signal of FIG. 6D is ensured by application of the fundamental characteristic of bar code symbols, described above. A control circuit ensures that the two-position circuit 56 is always reset to provide a transition from the first data state to the second data state. The control circuit comprises a one-shot circuit 62. The +T input of the one-shot circuit 62 is coupled to the Q output of the one-shot circuit 54.

Upon application of a first impulse from the one-shot circuit 54, signalling the start of a bar code symbol, the one-shot circuit 62 begins a negative going output pulse at its Q— output. The duration of this pulse is controlled by an internal timing circuit within the one-shot circuit 62, and is selected to create a pulse having a duration that is substantially longer than an amount necessary for the transmission/ reception of data representing a single bar code symbol. When the duration of the pulse is concluded, the Q— output of the one-shot circuit 62 reverts back to its normal untriggered (positive) state. This positive going trailing edge at the conclusion of the output pulse is A/C coupled to the RESET input of the two-position circuit 56 through the capacitor 64. The RESET input is normally tied to ground through resistor 66 to allow operation of the two-position circuit 56 in the "clocked/toggle" mode. The brief positive pulse resulting from the Q— output of the one-shot circuit 62 provides the RESET signal.

Any properly transmitted/received pulse sequence representing a bar code symbol automatically results in the output of the two-position circuit 56 being left in its first state (data 0) due to the fact that the final transition in such a signal would be a transition from bar-to-space. In this normal operation, the output of the control circuit is redundant and has no effect on the two-position circuit 56 since it is already in its RESET state. This output pulse of the control circuit 62 is relevant only in the event that improper transmission, reception or signal processing leave the two-position circuit 56 in its second state (data 1). In that case, the RESET signal provided by the control circuit 62 will have the necessary effect, and the next sequence of impulses will be processed with the proper polarity.

In an alternative embodiment of the present invention, the scanner 20 is provided with a circuit to reduce the amount of electrical power required by the scanner. The circuit provides an internal power source for the scanner 20 having three modes of operation. In a first mode of operation, power to the light transmitting element 22 and detecting element 25 is disabled until the scanner is moved. A motion detection switch can be utilized to detect that the scanner 20 is being moved or picked up by an operator in anticipation of use. In a second mode of operation, a reduced power level is provided to the light transmitting element 22 and detecting element 25 sufficient to detect the start of a bar code scanning operation. The reduced power level provides sufficient power to the detecting element 25 to detect that the scanner 20 has been brought into proximity with the bar code symbol 10, yet is not sufficient to transmit a signal. In a third mode of operation, a full power level is provided to the light transmitting element 22 and detecting element 25 so that the RF signal can be generated and transmitted. The scanner only draws power at the full power level when it is transmitting RF signals representative of the bar-to-space and space-to-bar transitions.

Having thus described a preferred embodiment of a cordless RF bar code scanner and receiver, it should be apparent to those skilled in the art that certain advantages of the within system have been achieved. It should also be appreciated that various modifications, adaptations, and alternative embodiments thereof may be made within the scope and spirit of the present invention. For example, the present invention is illustrated for use with a conventional light pen type of scanning input device, though it should be appreciated that alternative types of input devices could also be advantageously utilized, such as a pistol grip type handheld scanner or fixed position scanner. The invention is further defined by the following claims.

What is claimed is:

1. A system for reading a bar code symbol, comprising:

an encoding element adapted to receive a first signal representative of light reflected from said bar code symbol and provide a second signal comprising a series of impulses, with each of the impulses corresponding to a data state transition of said first signal; and a decoding element adapted to receive said second signal and provide said first signal.

2. The system of claim 1, wherein sail encoding element further comprises at least one one-shot circuit.

3. The system of claim 1, wherein said decoding element further comprises a positively triggered one-shot circuit and a two-position relay circuit having an input coupled to an output of said positively triggered one-shot circuit.

4. The system of claim 1, further comprising an RF transmitter coupled to said encoding element and providing an RF signal from said second signal.

5. The system of claim 4, further comprising an RF receiver coupled to said decoding element and adapted to receive said RF signal.

6. The system of claim 2, wherein said at least one one-shot circuit further comprise a monostable multivibrator.

7. The system of claim 1, wherein a first one of said impulses corresponds to a space-to-bar transition of said bar code symbol.

8. The system of claim 3, wherein said two-position relay circuit further comprises a bistable multivibrator.

9. The system of claim 2, wherein said at least one one-shot circuit further comprises a positively triggered one-shot circuit coupled in parallel with a negatively triggered one-shot circuit each having outputs coupled to respective inputs of a logical OR gate, an output of said logical OR gate providing said second signal.

10. The system of claim 3, further comprising a control circuit coupled to a reset input of said two-position relay circuit, wherein said control circuit returns said two-position relay circuit to an initial state.

11. The system of claim 1, further comprising an internal power source having three modes of operation, including a first mode in which power to said bar code encoding element is disabled, a second mode in which a reduced power level is provided to said bar code encoding element, and a third mode in which a full power level is provided to said bar code encoding element.

12. An apparatus for reading a bar code symbol including a light transmitting element and a light detecting element, the apparatus comprising:

means for encoding a first signal representing light reflected from said bar code symbol into a second signal comprising a series of impulses, with each of the impulses corresponding to a data state transition of said first signal;

an RF transmitter coupled to said encoding means and providing an RF signal based on said second signal;

an RF receiver adapted to receive said RF signal; and means for decoding said first signal from said RF signal;

whereby, a first one of said data state; transitions is decoded as a space-to-bar transition of said bar code symbol.

13. The apparatus of claim 12, wherein said encoding means further comprises a positively triggered one-shot circuit coupled in parallel with a negatively triggered one-shot circuit, an input of each of said one-shot circuits being coupled to receive said first signal, and an output of each of said one-shot circuits being coupled to respective inputs of a logical OR gate, wherein an output of said logical OR gate provides said second signal.

14. The apparatus of claim 13, wherein each of said one-shot circuits further comprise a monostable multivibrator.

15. The apparatus of claim 12, wherein said decoding means further comprises a positively triggered one-shot circuit coupled to receive said RF signal and a two-position relay circuit having an input coupled to an output of said one-shot circuit.

16. The apparatus of claim 15, wherein said one-shot circuit further comprises a monostable multivibrator.

17. The apparatus of claim 15, wherein said two-position relay circuit further comprises a bistable multivibrator.

18. The apparatus of claim 15, further comprising a control circuit coupled to a reset input of said two-position relay circuit, wherein said control circuit returns said decoding means to an initial state.

19. The apparatus of claim 12, wherein said encoding means further comprises an internal power source having three modes of operation, including a first mode in which power to said light transmitting and detecting elements is disabled, a second mode in which a reduced power level is provided to said light transmitting and detecting elements, and a third mode in which a full power level is provided to said light transmitting and detecting elements.

20. A method for reading a bar code symbol, comprising the steps of:

providing a first signal representative of light reflected from said bar code symbol;

converting said first signal to a second signal comprising a series of impulses, with each of the impulses corresponding to a data state transition of said first signal;

transmitting said second signal to a remote receiver;

reconstructing said first signal from said transmitted second signal, whereby a first one of said data state transitions of said bar code symbol.

21. The method of claim 20, further comprising the step of providing power for reading said bar code symbol at three modes of operation, including a first mode in which power is disabled, a second mode in which a reduced power level is provided, and a third mode in which a full power level is provided.

22. The method of claim 20, wherein said converting step further comprises converting said first signal into a series of impulses, each of said impulses corresponding in time to bar-to-space and space-to-bar transitions of said bar code symbol.

23. The method of claim 22, wherein said transmitting step further comprises modulating an RF carrier by said series of impulses.

* * * * *